Sept. 30, 1969  H. A. BARKUS  3,469,870

TELESCOPIC STRUCTURE WITH ROTATABLE SHAFT

Filed Nov. 24, 1967

INVENTOR.
HOMER A. BARKUS
BY Knox & Knox

United States Patent Office 3,469,870
Patented Sept. 30, 1969

3,469,870
TELESCOPIC STRUCTURE WITH ROTATABLE SHAFT
Homer A. Barkus, San Diego, Calif., assignor of fifty percent to Charles M. Barkus, Arcadia, Calif.
Filed Nov. 24, 1967, Ser. No. 685,653
Int. Cl. F16b 7/10; E04d 15/14
U.S. Cl. 287—58
4 Claims

ABSTRACT OF THE DISCLOSURE

A structure comprising a casing of indeterminate configuration and a shaft telescopically adjustable to any of a number of indexed positions, the concealed indexing element incorporating guide means by which each position can be readily located and selected, the shaft being securely locked at each position against telescopic movement but at any locked position the shaft and indexing element are rotatable within the casing of the structure under minor restraint, a frictional drag means effectively holding the indexing element against rotation while the shaft is being telescopically shifted.

BACKGROUND OF THE INVENTION

The present invention relates to telescopic structure and specifically to a structure having the capability of telescopic adjustment and restrained rotatability of a shaft or spindle-like portion.

Most telescopic struts or posts use either wedge type or frictional clamping means to hold the movable portion at any position, or a positive indexing means with a number of fixed positions. The latter type usually has a fixed member with spaced notches and a slidable member with a pin or lug which can be engaged in any one of the notches. This arrangement locks the portions together and prevents relative rotation, so that separate bearings must be used for any rotatable attachment to the strut.

SUMMARY OF THE INVENTION

The structure described herein has a telescopically adjustable shaft which can be engaged and locked at any selected position on an indexing element by the pin and notch type structure, but with the added advantage that the indexing element is rotatable in an outer casing which fully encloses the mechanism. A combined rotary and axial motion is used to lock and unlock the adjustable shaft, and frictional drag means is used to hold the indexing element against rotation during the locking and unlocking, while allowing the interlocked elements slightly restrained rotation within the casing. To facilitate location of the concealed indexed positions, the indexing notches have inclined entry portions which guide the locking pin on the adjustable shaft portion of the structure. The simple mechanism is completely enclosed but is readily accessible by removing one end cap from the casing.

BRIEF DESCRIPTION OF THE DRAWINGS

Similar characters of reference indicate similar or identical elements and portions throughout the specification and throughout the views of the drawings.

DESCRIPTION OF THE PREFERRED EMBODIMENT

Figure 1:
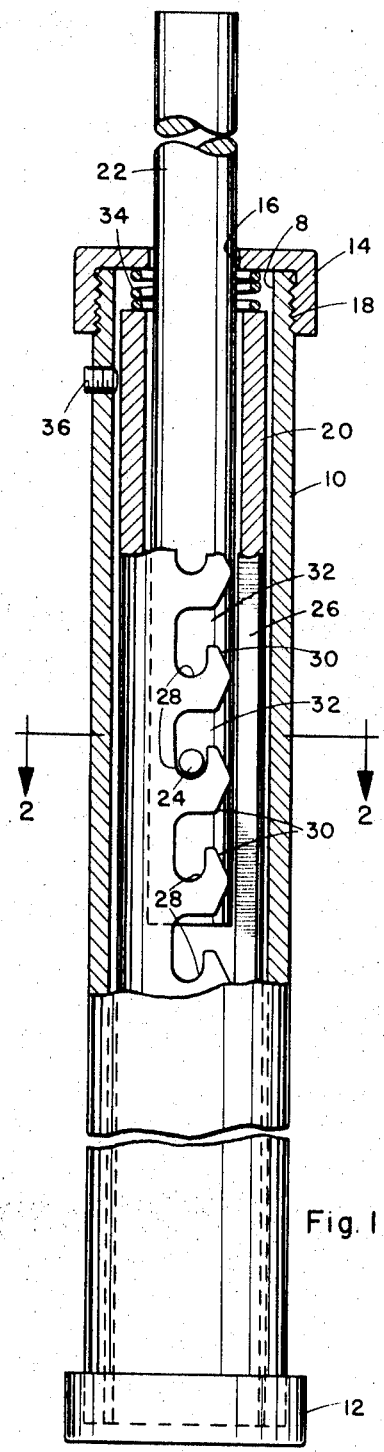
FIGURE 1 is a side elevation view of the complete structure, with portions cut away to reveal the mechanism.

The structure has a casing of any desired shape having a bore 8, the drawing, for convenience, representing an elongated cylindrical casing 10 with a fixed end cap 12 closing one end and a removable end cap 14 on the other end and closing the bore 8. End cap 14 has a central opening 16 and may be held in place by screw threads 18, or any other suitable retaining means. Within casing 10 is a cylindrical indexing sleeve 20, which is slightly shorter than the internal length of the casing and is rotatable therein. Axially slidable in indexing sleeve 20 is the movable portion or post which will be referred to simply as the shaft 22, which extends through opening 16. Fixed in shaft 22 is a radially projecting locking pin 24, which slides in a longitudinal slot 26 in the indexing sleeve 20. Longitudinally spaced along one side of slot 26 are right angled bayonet notches 28 into which locking pin 24 can be selectively seated. To facilitate engagement of the locking pin, each notch has inclined entry faces 30 diverging from slot 26 into the entry portion 32 of the notch.

Figure 2:
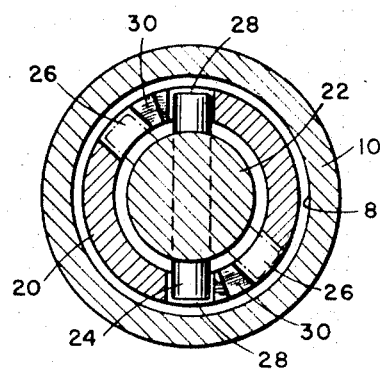
FIGURE 2 is an enlarged sectional view taken on line 2—2 of FIGURE 1.
Figure 3:
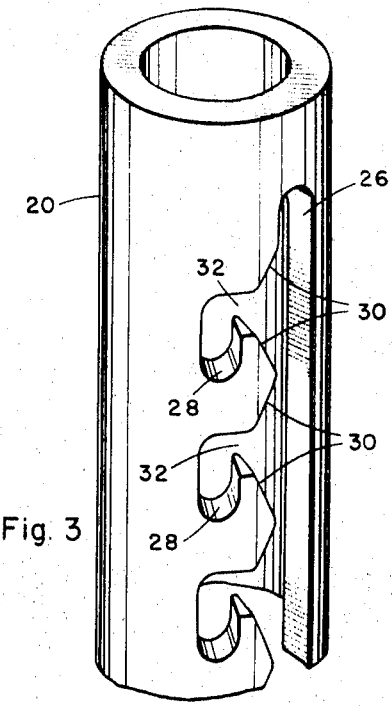
FIGURE 3 is an enlarged perspective view of a portion of the indexing element.

As illustrated in FIGURE 2, the locking pin 24 projects from both sides of shaft 22 and sleeve 20 has diametrically opposed slots 26, each with correspondingly spaced bayonet notches 28. This doubles the load carrying capacity of pin 24, but a single slot configuration may be sufficient for many purposes.

Frictional drag is applied to the indexing sleeve 20 by a compression spring 34 held under compressive load between end cap 14 and the adjacent end of the sleeve. The spring pressure is sufficient to retard the indexing sleeve against free rotation, but will allow the sleeve slightly restrained rotatability when a small amount of force is applied.

The shaft 22 is easily moved to the required position with pin 24 riding in slot 26. When the selected position is reached the shaft is rotated to turn locking pin 24 into the adjacent notch 28, the inclined entry faces 30 guiding the pin and causing the operator to feel any slight axial adjustment which may be necessary. Spring 34 holds the sleeve 20 while the shaft 22 is being manipulated. With the pin 24 seated in a selected notch 28 the shaft 22 and sleeve 20 are interlocked as a unit and can rotate within casing 10.

This makes the structure particularly suitable for use as a support for the swivelling seat of a stool, a rotatable table, or similar rotary structure. Further uses could include a microphone stand, a light boom support and many others. The member may also be used as a normal telescopic strut without utilizing the rotatable feature, the easily indexed structure making adjustment very simple. If it is necessary to lock the post against rotation, this is readily accomplished by means of a set screw 36 threaded through casing 10 near one end to bear against sleeve 20 when tightened. Removal of end cap 14 allows the structure to be completely dismantled for lubrication or other servicing.

It should be understood that the bayonet notches 28 could be made double ended, or substantially T-shaped, to provide positive locking of the member in tension as well as compression, but this feature in itself is well known.

It is understood that minor variation from the form of the inventiton disclosed herein may be made without departure from the spirit and scope of the invention, and that the specification and drawing are to be considered as merely illustrative rather than limiting.

I claim:
1. A telescopic, rotatable structure comprising:
a casing having a bore;
an indexing sleeve mounted in said bore for rotation therein;
frictional drag means engaging said sleeve and restraining said sleeve from free rotation;
a shaft axially slidable in said sleeve and extending beyond said sleeve and bore;
a locking pin projecting substantially radially from said shaft;
said sleeve having a slot extending longitudinally thereof and in which said pin is slidable;
and a plurality of bayonet notches in said sleeve and spaced along said slot, in which said pin is selectively engageable.

2. The structure of claim 1, wherein said frictional drag means is a compression spring compressed between said sleeve and said casing.

3. The structure of claim 2, wherein said casing has a cap at the end of said bore through which said shaft extends and said spring is compressed between said cap and the adjacent end of said sleeve.

4. The structure of claim 1, wherein each of said notches has inclined entry faces from said slot into the notch to guide said pin into a selected notch.

References Cited

UNITED STATES PATENTS

| | | | |
|---|---|---|---|
| 627,516 | 6/1899 | Morgan | 248—407 |
| 1,951,754 | 3/1934 | Gilbert. | |
| 2,376,716 | 5/1945 | Odin. | |
| 2,483,396 | 10/1949 | Benson. | |
| 2,748,261 | 5/1956 | Wolar. | |

DAVID J. WILLIAMOWSKY, Primary Examiner

WAYNE L. SHEDD, Assistant Examiner

U.S. Cl. X.R.

108—95, 150; 248—407, 414